Sept. 29, 1970  E. D. McMURRY ET AL  3,530,566
METHOD OF MAKING BELLOWS ASSEMBLY
Original Filed Aug. 23, 1966  3 Sheets-Sheet 1
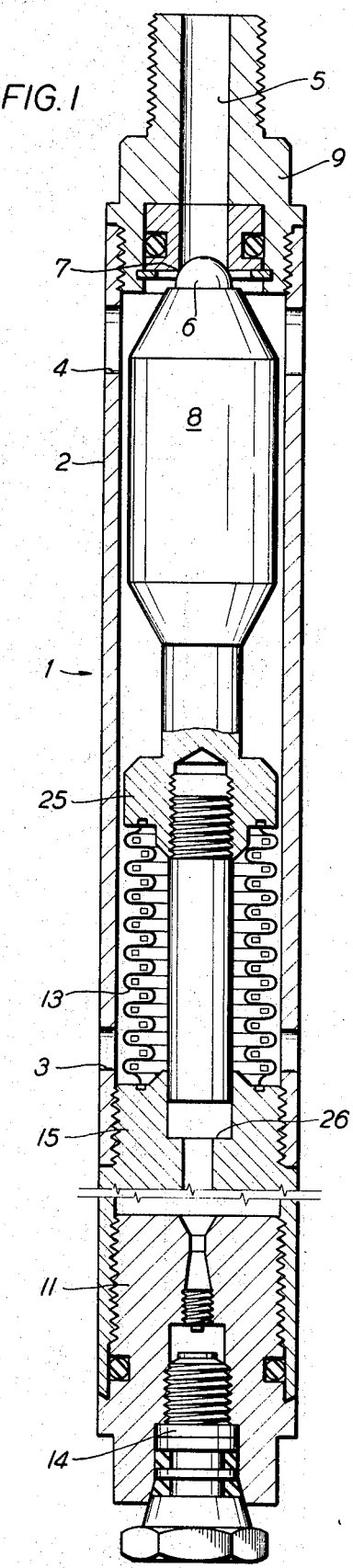
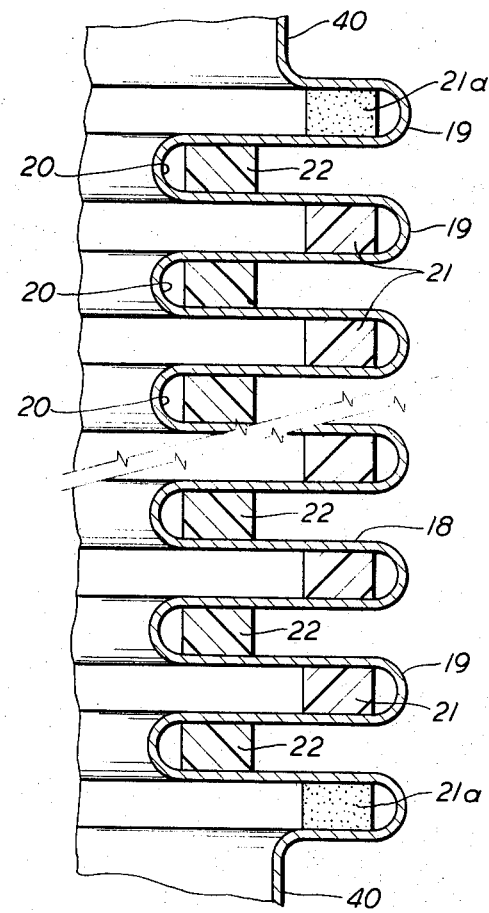
EVERETT D. McMURRY,
KNUD I. BRUUN &
BOLLING A. ABERCROMBIE
INVENTORS
BY Arnold, Roylance,
Kruger & Durkee
ATTORNEYS EVERETT D. McMURRY,
KNUD I. BRUUN &
BOLLING A. ABERCROMBIE
INVENTORS BY Arnold, Roylance,
Kruger & Durkee

ATTORNEYS

Sept. 29, 1970  E. D. McMURRY ET AL  3,530,566
METHOD OF MAKING BELLOWS ASSEMBLY
Original Filed Aug. 23, 1966  3 Sheets-Sheet 3
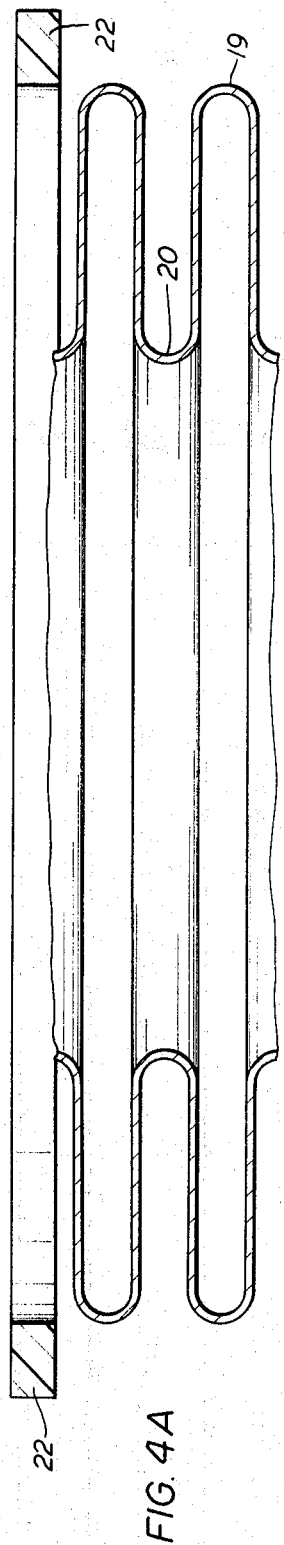
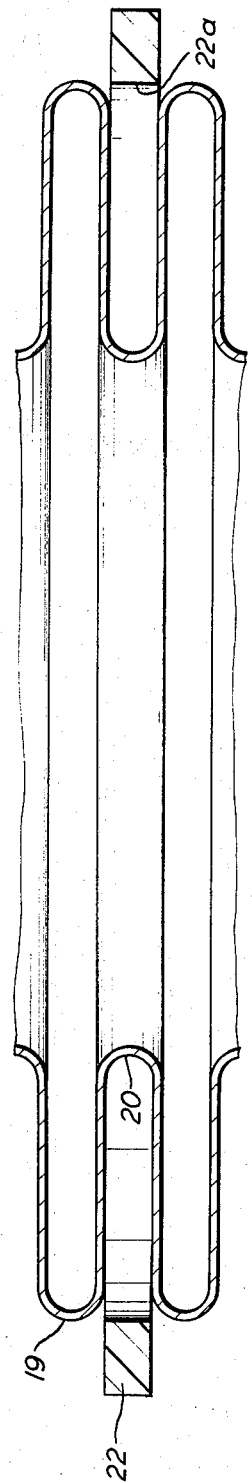
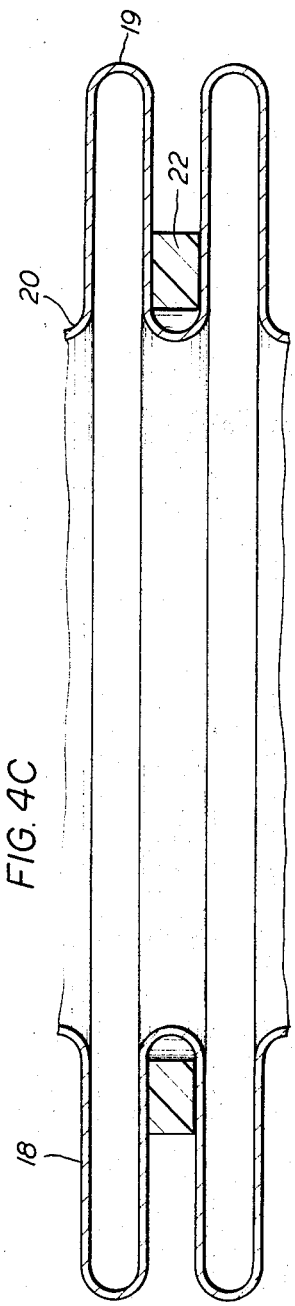
FIG. 4A
FIG. 4B
FIG. 4C
EVERETT D. McMURRY,
KNUD I. BRUUN &
BOLLING A. ABERCROMBIE
INVENTORS
BY Arnold, Roylance,
Kruger & Durkee
ATTORNEYS United States Patent Office 3,530,566
Patented Sept. 29, 1970

3,530,566
METHOD OF MAKING BELLOWS ASSEMBLY
Everett D. McMurry, Knud I. Bruun, and Bolling A. Abercrombie, Houston, Tex., assignors, by direct and mesne assignments, to McMurry Oil Tool Specialties, Inc., Houston, Tex.
Original application Aug. 23, 1966, Ser. No. 574,323. Divided and this application Jan. 8, 1968, Ser. No. 696,456
Int. Cl. B23p 11/02, 19/04
U.S. Cl. 29—447
8 Claims

ABSTRACT OF THE DISCLOSURE

Improved rigid metallic bellows apparatus capable of resisting severe longitudinal compression without creasing or flattening of convolutions, and method of manufacturing same. Endless ring members are disposed in the convolutions both inside and outside of the bellows, the end ring members being preferably formed of heat or flame resistant material such as asbestos, and the other ring members being preferably formed on Teflon.

This is a divisional application of copending application, Ser. No. 574,323, filed Aug. 23, 1966, now abandoned, entitled, "Bellows Assembly and Method."

This invention relates to a novel bellows system wherein the convolutions of the bellows are protected against damage resulting from excessive contraction of the bellows. The invention further relates to a method of providing such a bellows system.

BACKGROUND OF THE INVENTION

A bellows is a spring-like member which may be used in a great many instruments, such as valves. For example, gas lift valves which are used in the oil and gas industry in the production of oil, often include a bellows member (see, for instance, McMurry U.S. Pat. No. 3,175,-514). As used in such valves, the bellows is typically a hollow cylindrical device constructed of a flexible material, and having a plurality of corrugations in the form of a plurality of inwardly opening convolutions and a plurality of outwardly opening convolutions. The bellows expands and contracts along its longitudinal axis in response to pressure differentials.

Serious problems have existed in connection with bellows system of the prior art due to deformation of the convolutions of the bellows due to excess internal and external pressures, since repeated expansion and contraction of deformed bellows will inevitably create a rupture in the wall of the bellows. The problems are most severe with the outwardly opening convolutions, as field experience has shown that most bellows failures are due to a rupture of an outwardly opening convolution. However, a deformed inwardly opening convolution will also rupture.

In many contexts of use, for instance in the gas lift valve where the bellows member may be located hundreds of feet down hole, the difficulty and expense of replacing the damaged bellows is readily seen to be extreme. Therefore, a means of protecting the bellows against such damage has long been needed.

Heretofore, several such means have been suggested. One such suggestion which appears in Pat. No. 2,490,513, was to position circular springs (e.g., coil springs) around the convolutions, tension springs around the outwardly opening convolutions and compression springs around the inwardly opening convolutions. Several difficulties are inherent in this arrangement. For instance, under high pressures the bellows material will often flow into the space between the spring turns. Further, since such springs for outwardly opening convolutions must be stretched over the larger inwardly opening convolutions, they are often distorted and fail to provide the support necessary for back-up for these critical points where failure of the bellows so often occurs.

Solid split rings have also been suggested in Pat. No. 2,963,043, to remedy the problem. These rings have been found deficient, however, in that the bellows material expands around and is cut by edges of the ring where the ring is split, resulting in damage to the bellows material and failure of the bellows. Further, the bellows convolution is not protected in the area where the ring is split. These deficiencies are present even where the ring is tapered in the area wherein it is split.

Solid metal or plastic rings of the prior art have also been unsatisfactory. It has not been found possible to insert solid metal rings in the inner and outer convolutions without, at the same time, deforming the bellows. Plastic rings of the prior art, especially when used for outwardly opening convolutions, have been generally unsatisfactory in that precise shaping of such rings has been impossible with previous methods and consequently such rings would not remain in contact with a convolution around the entire circumference of the convolution, resulting, of course, in insufficient support for the convolution.

Further problems with these solid prior art rings have included the sensitivity of some such rings to heat which is used in soldering operations at the end of the bellows, and the entrapment of gas behind the rings resulting eventually in the rings' blowing out.

The present invention provides a bellows system whereby each of the outwardly opening convolutions, the most sensitive area of the bellows, is supported around its entire circumference with a solid ring. An the inwardly opening convolution may be likewise protected with size-stable endless rings. Special heat-resistant rings may be used for the inwardly-facing convolutions adjacent the ends of the bellows where soldering or other heating operations may occur. Also according to the present invention, the problem of gas entrapment behind the ring is eliminated with rings preferably having rectangular cross sections. These results are acomplished also by use of the novel methods of this invention.

THE DRAWINGS

The invention will be explained with reference to the accompanying drawings, which form a part of this specification and which illustrate certain desired embodiments of the invention, and wherein:

FIG. 1 is a partial elevational view of a gas lift valve employing therein a bellows.

FIG. 2 is a fractional elevational view of a bellows in vertical section having therein rings constructed in accordance with this invention.

Figure 3A:
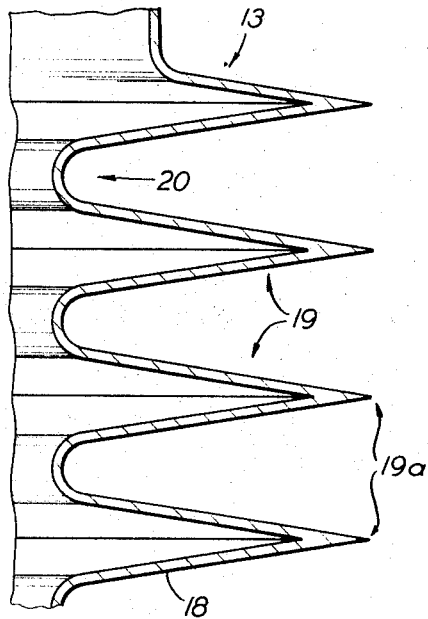

FIGS. 3a, 3b, 3c, and 3d are fractional elevational views of a bellows in vertical section, showing four different shapes assumed by the bellows under different conditions.

FIGS. 4a, 4b, and 4c are fractional elevational views of a vertical section of a bellows, showing three different steps in a novel method of this invention.

DETAILED DESCRIPTION

Referring now more particularly to FIG. 1, there is illustrated a gas lift valve 1 having an elongated generally tubular housing 2. In its operating position, the valve may be positioned adjacent the tubing string in a well, in the annulus between the tubing and the well casing. The housing 2 contains suitable openings, such as those illustrated at 3 and 4, for fluid communication between the annulus and the interior of housing 2. A tubular coupling element 9 is seen to be threadedly connected to the housing 2 at its upper extremity, the coupling element 9 having therein a bore 5 for fluid communication from within the housing 2 to the interior of the well tubing.

Flow from the annulus, through the valve, and into the tubing via the bore 5 is controlled by the valve member 6, which is adapted to at times seat on the valve seat 7 and at times to be removed from said seat. The valve member 6 is carried by a valve carriage 8, the carriage being integrally connected at its lower end to a fitting 25 which is threadably connected to an inner elongate valve stem 10.

At its lower end, the housing 2 is seen to be threadedly connected by means of coupling element 15 to a plug 11, in which is positioned a screw fitting 14. Surrounding the stem 10 is a suitable bellows 13, the lower portiton of which is affixed to the coupling element 15. The belows 13, plug 11, fitting 25, and coupling element 15 define a pressure chamber 12. As may also be seen in FIG. 1, the inside diameter of coupling element 15 is smaller through its lower section, thus providing a shoulder 26 which acts as a stop for stem 10 to limit its downward travel. Thus, the screw fitting 14 may be removed to charge the pressure chamber 12 with a gas under pressure. The bellows 13 then operates to urge the valve member 6 in a manner such as that which is fully described in said McMurry U.S. Pat. No. 3,175,514.

It is the intended function of the bellows 13, that it act as a tension member or spring, to open or close the gas lift valve 1 depicted in FIG. 1, depending upon the pressure inside and outside of the bellows 13. In other words when the pressure inside of the bellows 13 is greater than the outside or ambient pressure on the bellows 12, the bellows 13 will tend to expand longitudinally. Alternatively, when the outside pressure exceeds the pressure inside the bellows 13, the bellows 13 will tend to contract longitudinally to unseat the valve member 6 from the valve seat 7, and thus to open the gas lift valve 1. During "normal" conditions, i.e., the pressure outside of the bellows 13 is slightly less than the pressure inside, and thus the bellows 13 will be elongated or extended longitudinally, so that the valve member 6 will be seated in the valve seat 7. Thus, FIG. 1 shows the gas lift valve to be "normally closed."

Referring now to FIG. 2, there may be seen a more detailed view of the bellows 13 depicted in FIG. 1, wherein the bellows 13 is shown as constructed of a corrugated tube 18 of flexible but highly resilient material having a plurality of inwardly facing convolutions 19 and outwardly facing convolutions 20. As may also be seen the fold adjacent each end 40 of the tube 18 is an inwardly facing convolution 19 so that the bellows 13 may be fitted gas tightly into the coupling element 15 and fitting 14, respectively.

The bellows 13 are depicted in FIG. 2 in the form they normally assume when only silghtly compressed, as when they are mounted in the gas lift valve 1 and the inside and outside pressures are substantially equal. There may be further seen to be a relatively larger diameter endless ring 21 and 21A disposed in each inwardly facing convolution 19, and a relatively smaller diameter endless ring 22 disposed in each outwardly facing convolution 20. Rings 21 and 22 are each preferably formed of polytetrafluorethylene resin, and each preferably has rectangular cross sections of the same size and shape. Each ring 21A preferably has rectangular cross sections of the same size and shape as rings 21. However, as hereinbefore stated, rings 21A are each preferably formed of a flame or heat-resistant material such as asbestos.

Referring now to FIG. 3a, there is shown a pictorial representation of the shape of the bellows 13, when the outside pressure substantially exceeds the inside pressure, and when rings 21, 21A, and 22 have been omitted from the folds or convolutions 19 and 20. In this environment, the bellows 13 are not only longitudinally compressed or shortened, but the portions of the wall of the corrugated tube 18 which define the inwardly facing convolutions 19 have been squeezed flat. This produces a weakening in the fold lines 19A, and if the bellows 13 are thereafter continually expanded and contracted, a rupture or break will inevitably occur in the wall of the corrugated tube 18 at the creases 19A caused by such flattening.

Figure 3B:
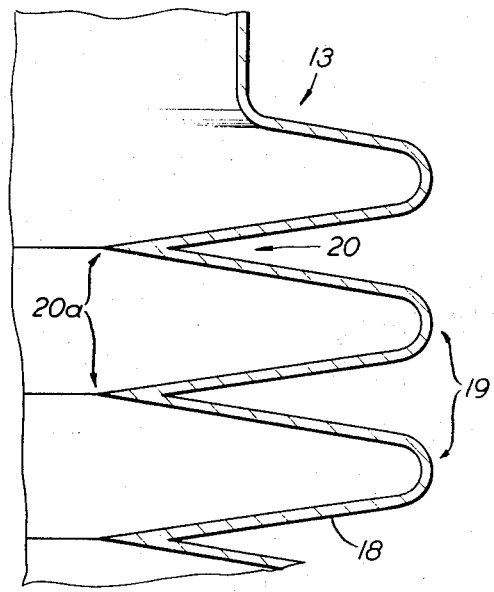
Figure 3C:
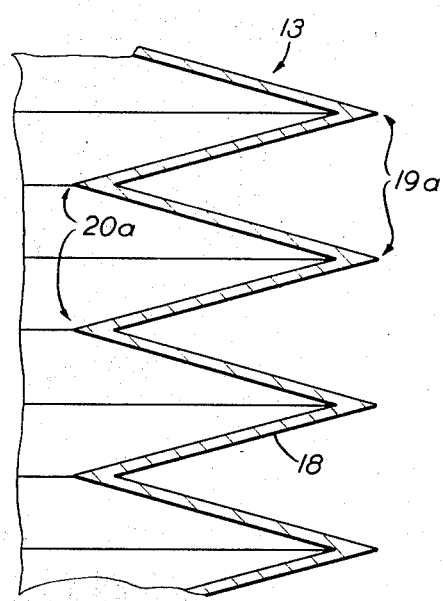

Referring now to FIG. 3b, there may be seen a similar pictorial representation of the shape of the bellows 13, when the outside pressure is substantially less than the inside pressure, and when rings 21, 21A, and 22 have not been inserted in the folds or convolutions 19 and 20. In this environment, the bellows are not only longitudinally expanded, but the outwardly facing convolutions 20 have been squeezed flat. In this condition, there is a similar weakness in the fold lines 20A, and if the bellows 13 are thereafter continually expanded and contracted, a rupture will inevitably occur in the tube 18 at the creases 20A caused by such flattening.

It should be clearly understood that FIG. 3a is intended primarily to depict the condition assumed by the bellows 13 when rings 21 and 21A are omitted, and when the outside pressure substantially exceeds the inside pressure. It should be further understood that FIG. 3b is intended primarily to depict the shape or condition of the bellows 13 when rings 22 are omitted, and when the inside pressure substantially exceeds the outside pressure. Once creases have been made along the fold lines 19A and 20, they will remain and thus the wall of the corrugated tube 18 will not regain a rounded shape at these points even if the pressure differential disappears. Thus, if the outside pressure is first greater than the inside pressure, and if the outside pressure is thereafter substantially less than the inside pressure (and rings 21, 21A, and 22 are omitted), the tube 18 will assume the shape depicted in FIG. 3c. In this condition, creases now appear along fold lines 20A as well as 19A. Although experience has shown that ruptures will most likely occur first in one of the fold lines 20A, it will be apparent that the likelihood of a rupture occurring someplace in the corrugated tube 18 is almost twice as great, when no rings 21, 21A, and 22 at all are inserted in or about the tube 18.

Figure 3D:
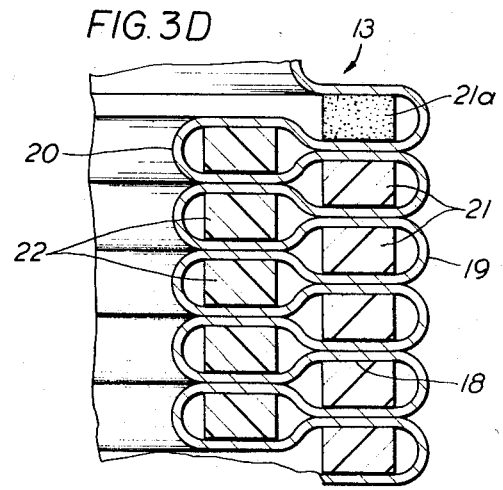

Referring now to FIG. 3d, there may be seen a pictorial representation of the bellows 13, when the outside pressure is far in excess of the inside pressure, but also when the rings 21, 21A, and 22 have been inserted in the appropriate convolutions in the wall of the corrugated tube 19. In this case, it will be clearly apparent that the presence of the rings 21, 21A, and 22 have prevented the creation of any creases or fold lines 19A or 20A at either the inwardly or the outwardly facing convolutions 19 and 20. Since it is the creases or fold lines which tend to rupture, the function of rings 21, 21A, and 22 should be clearly apparent.

The rings 22 are desirably constructed of a material which will shrink a known amount upon the application of heat. Such a material may be any suitable fluorocarbon polymer such as polytetrafluoroethylene resin. The method of application of the rings 22 to the outwardly opening convolutions 20 of the bellows 13 may be readily understood by reference to FIGS. 4a, 4b, and 4c. Here the ring 22, which is originally constructed of a size convenient for insertion around an inwardly opening convolution 19 which is immediately adjacent and longitudinally spaced from the outward opening convolution 20 around which the ring to be placed, is passed around the inwardly opening convolution 19 in FIG. 4a. As shown in FIG. 4b, the ring 22 is then moved into juxtaposition with the outwardly opening convolution 20. Sufficient heat (normaly about 600°–700° F.) is then applied to the ring 22, as by heating the bellows in an electric oven, to shrink the ring so that the ring moves into contact with the outer periphery of the convolution around the entire circumference of the convolution. Further application of heat will not further shrink the ring 22. It is thus seen, in FIG. 4c, that the inner periphery 22A of the ring 22 is in contact with the outwardly opening convolution 20, and will act as a solid full-circle support for said convolution to increase the endurance limit of the bellows material at that point notwithstanding repeated expansion and contraction of the bellows 13.

The inwardly opening convolutions 19 may be likewise supported around their full circle by the continuous rings 21 which may be constructed as hereinbefore stated, of preshrunk polytetrafluoroethylene resin. For best results, such rings must be size stable; that is, they must be sufficiently preshrunk so that they will not shrink or expand when subjected to the temperatures commonly encountered in the environment in which they are to be used.

These rings are conveniently inserted into the inwardly opening convolutions after all of the rings around the outwardly opening convolutions have been positioned, so that they will not be damaged by the heat employed in shrinking the rings 22. The bellows are allowed to fold around each of these rings after insertion so as to hold the rings in place.

Special problems are inherent in connection with the rings which are used around the inwardly opening convolutions 19 located at the ends of the corrugated tube 18 where soldering or other such heating operations are employed. Such operations, which may be undertaken at temperatures which typically range from about 400° to about 500° F., have been found to shrink a polytetrafluoroethylene ring located in this convolution, tending to cause that ring to shrink away from the end convolution 19 to thereby leave that convolution without proper insert support. According to this invention, these rings 21A are constructed of a material which is resistant to the temperatures customarily employed in such soldering operations. For instance, the rings such as that illustrated at 21A may be constructed of asbestos. In this manner, the ring 21A is not shrunk by heat from soldering.

Further in accordance with this invention, it has been found that rings of generally circular cross section, when shrunk around an outwardly opening convolution 20 in the manner hereinbefore described, sometimes function to trap fluid between the inner periphery of the ring 22 and the outer periphery of the convolution 20. This problem, it has been found, can be greatly reduced by the use of rings of rectangular cross section, as hereinfore depicted and described. Of course, it will thus be apparent that other cross-sectional shapes may be employed provided such shapes are generally noncircular. For example, rings having a triangular or even rhombic shaped cross section may be used.

It is thus apparent from the foregoing description that novel means have been provided for preventing the convolutions of the bellows 13 from being flattened into sharp creases or fold lines which tend to weaken and rupture during normal operation of the gas lift valve 1. It is also apparent that provision has been made for providing special protection for the end convolutions of the bellows 13. Further, it is apparent that novel methods have been provided for assembling a bellows 13 of the type commonly used in apparatus of the character described with respect to FIG. 1.

What the invention has been explained in terms of particularly advantageous embodiments, it will be understood by those skilled in the art that various changes may be made in the structures described herein without departing from the scope of the invention, which is defined by the following claims.

We claim:

1. A method of constructing a bellows apparatus for use in a gas-lift valve assembly, comprising
    selecting a permanently deformable metallic tubular member having a plurality of rounded and equal alternate circumferential convolutions,
    forming from a fluorocarbon polymer material a plurality of endless outside ring members each having a solid cross section and a preselected inside diameter corresponding substantially to the outside diameter of said tubular member across each of the outwardly facing ones of said convolutions,
    stretching each of said outside ring members to enlarge the inside diameter of each ring to a magnitude substantially equal to the outside diameter of said tubular member across each of the inwardly facing ones of said convolutions,
    disposing each of said stretched outside ring members about the exterior of said tubular member and adjacent different respective ones of said outwardly facing convolutions therein without mechanically deforming said tubular member, and
    thereafter heating said tubular member and outside ring members to a preselected temperature to shrink said stretched ring members snugly about said tubular member and into said respective outwardly facing convolutions.

2. The method described in claim 1, wherein said outside ring members are formed polytetrafluoroethylene resin.

3. The method described in claim 2, wherein each of said outside ring members is formed with a substantially rectangular cross section.

4. The method described in claim 1, further comprising
    forming from a fluorocarbon polymer material a plurality of endless inside ring members each having a solid cross section and an outside diameter corresponding substantially to the inside diameter of said tubular member across each of the inwardly facing ones of said convolutions, and
    disposing of said fluorocarbon inside ring members into different respective ones of said inwardly facing convolutions without mechanically deforming said tubular member.

5. The method described in claim 4, wherein said inside and outside ring members are formed of polytetrafluoroethylene resin.

6. The method described in claim 5, wherein each of said inside and outside members are formed with a substantially rectangular cross section.

7. The method described in claim 6, further including
    forming an additional pair of endless inside ring members from a material having a high heat resistivity and with a substantially rectangular cross section and an outside diameter corresponding substantially to the inside diameter of said tubular member across each of said inwardly facing convolutions, and
    disposing said pair of inside ring members into the end ones of said inwardly facing convolutions in said tubular member.

8. The method described in claim 7, wherein said additional pair of inside ring members are formed of asbestos.

References Cited

UNITED STATES PATENTS

| | | | |
|---|---|---|---|
| 1,998,356 | 4/1935 | Brown | 264—230 X |
| 2,027,962 | 1/1936 | Currie. | |
| 2,490,513 | 12/1949 | Dreyer | 92—42 X |
| 2,877,070 | 3/1959 | Lee | 29—447 X |
| 3,313,017 | 4/1967 | Zingali | 264—230 X |
| 3,417,177 | 12/1968 | Simons et al. | 264—230 |
| 2,920,656 | 1/1960 | Bertolet | 92—42 |
| 1,382,081 | 6/1921 | Heiliger | 29—454 |

FOREIGN PATENTS

Ad. 74,627  12/1960  France.

CHARLIE T. MOON, Primary Examiner

U.S. Cl. X.R.

29—454; 92—42; 264—230, 342